US011970806B2

(12) United States Patent
Isik

(10) Patent No.: US 11,970,806 B2
(45) Date of Patent: Apr. 30, 2024

(54) DYEING MACHINE

(71) Applicant: Habibe Yildiz Arifioglu, Kahramanmaras (TR)

(72) Inventor: Fatih Isik, Kahramanmaras (TR)

(73) Assignee: HABIBE YILDIZ ARIFIOGLU, Kahramanmaras (TR)

( * ) Notice: Subject to any disclaimer, the term of this patent is extended or adjusted under 35 U.S.C. 154(b) by 517 days.

(21) Appl. No.: 17/275,805

(22) PCT Filed: Sep. 12, 2019

(86) PCT No.: PCT/TR2019/050748
§ 371 (c)(1),
(2) Date: Mar. 12, 2021

(87) PCT Pub. No.: WO2020/112054
PCT Pub. Date: Jun. 4, 2020

(65) Prior Publication Data

US 2022/0049393 A1 Feb. 17, 2022

(30) Foreign Application Priority Data

Oct. 1, 2018 (TR) ................................ 2018/14243

(51) Int. Cl.
*D06B 11/00* (2006.01)
*B41J 3/407* (2006.01)
(Continued)

(52) U.S. Cl.
CPC ......... *D06B 11/0023* (2013.01); *B41J 3/4078* (2013.01); *D06B 17/04* (2013.01); *D06B 23/04* (2013.01)

(58) Field of Classification Search
CPC ...... D06B 17/04; D06B 23/04; D06B 11/002; D06B 11/0023; D06B 1/02; D06B 5/06; D06B 9/02
See application file for complete search history.

(56) References Cited

U.S. PATENT DOCUMENTS 3,285,039 A * 11/1966 Macomson ............ D21H 23/50 68/184
3,828,405 A * 8/1974 DeVinney .......... D06B 11/0036 8/151.2

(Continued)

FOREIGN PATENT DOCUMENTS

CN 201648744 U 11/2010
CN 106702632 A * 5/2017

(Continued)

OTHER PUBLICATIONS

International Search Report and Written Opinion of the International Searching Authority for International Patent Application No. PCT/TR2019/050748 dated Dec. 19, 2020, 11 pages.

*Primary Examiner* — Spencer E. Bell
*Assistant Examiner* — Omair Chaudhri
(74) *Attorney, Agent, or Firm* — Merchant & Gould P.C.

(57) ABSTRACT

The present invention relates to a dyeing machine (1) having at least one each vertical guides (24) positioned at the two sides of at least one body (20) for realizing dyeing during wrapping of the yarn (223) from at least one first bobbin (21) to the second bobbin (22), at least one sprayer drive mechanism (17) which can move vertically on said vertical guide (24), at least one bobbin carrier (224), at least one drum (23) which contacts the surface of said second bobbin (22) positioned on said bobbin carrier (224), at least one first drive element (231) where said drum (23) is connected from one side for providing movement of said drum (23), at least one fourth drive element (171) for moving said sprayer drive mechanism (17), at least one sprayer (16) which realizes dyeing while the yarn (223), positioned on said sprayer drive mechanism (17), is wrapped onto the second bobbin (22), and at least one pump (14) connected to at least one dye kier (11) for obtaining the dye needed by said sprayer (16). The improvement of the present invention is that in order to provide realization of stamping dyeing, the subject matter dyeing machine (1) comprises at least one sensor (18) which detects the deviation between the position of the sprayer (16) and at least one predetermined stamping region (221) on said second bobbin (22), at least one second drive element (232) configured to rotate the second bobbin (22) in a direction which is opposite to the direction of the first drive (Continued)

element (231) in order to provide alignment of the sprayer (16) with said stamping region (221), and at least one control unit (30) associated to said sensor (18) in order to control the operation of said fourth drive element (171) by means of said second drive element (232).

5 Claims, 2 Drawing Sheets

(51) Int. Cl.
*D06B 17/04* (2006.01)
*D06B 23/04* (2006.01)

(56) References Cited

U.S. PATENT DOCUMENTS

| | | | | |
|---|---|---|---|---|
| 3,899,903 A * | 8/1975 | Lapierre | D06B 11/0023 68/205 R |
| 4,068,502 A * | 1/1978 | Anderson | D06B 11/0023 68/205 R |
| 6,019,799 A | 2/2000 | Brown | |
| 6,413,632 B1 * | 7/2002 | Pascoe | D06B 11/0023 428/364 |
| 2003/0135931 A1 * | 7/2003 | Shaw | D03J 1/04 8/115.6 |
| 2011/0254896 A1 * | 10/2011 | Ferrarotti | B41J 3/4078 29/890.1 |

FOREIGN PATENT DOCUMENTS

| | | | | | |
|---|---|---|---|---|---|
| CN | 106702633 | A | | 5/2017 | |
| CN | 106906584 | A | * | 6/2017 | D06B 1/02 |
| CN | 106906584 | A | | 6/2017 | |
| CN | 107099955 | A | * | 8/2017 | |
| CN | 108396477 | A | * | 8/2018 | |
| CN | 109371601 | A | * | 2/2019 | D06B 23/04 |
| JP | 11-222764 | A | | 8/1999 | |
| JP | 2003342867 | A | * | 12/2003 | |
| KR | 20080000842 | U | * | 5/2008 | |
| KR | 20140148095 | A | * | 12/2014 | |
| WO | WO-2020074024 | A1 | * | 4/2020 | |

* cited by examiner

DYEING MACHINE

CROSS-REFERENCE TO RELATED APPLICATIONS

This application is a National Stage Application of PCT/TR2019/050748, filed 12 Sep. 2019, which claims the benefit of Turkish Patent Application No. 2018/14243, filed 1 Oct. 2018 in Turkey, and which applications are incorporated herein by reference. To the extent appropriate, a claim of priority is made to each of the above-disclosed applications.

TECHNICAL FIELD

The present invention relates to a dyeing machine in order to provide dyeing of yarn in textile.

PRIOR ART

In the dyeing processes in filature; bobbin degrade dyeing, skein degrade dyeing and mosaic dyeing are used. Yarns are transferred from the bobbin to the skein in skein degrade dyeing. The yarns transferred to the skein are laid on a table. The yarn is dyed by means of spraying dye through the nozzles provided on the table. Afterwards, string is wrapped onto the bobbin from the skein. Here, providing pattern necessitates effort. In multiple color studies, the colors may contact each other. The dyeing length cannot decrease to a level lower than a specific limit. The most important factor is that the technological opportunity to write report and narration is not given again. The "report" refers to a documented record of specific color combinations, patterns, or workflows used during the dyeing process to ensure repeatability and control of the dyeing machine's operations. In this case, extra energy, labor and time losses occur. Moreover, measurement scope is narrow. Dyeing with the desired length cannot be realized. Dimensions shorter than 5 cm cannot be given in skein dyeing. In skein degrade dyeing, there is no stability. This leads to occurrence of random effects. Dye spreading cannot be controlled and repeatability is low. Color types are limited. The machines in the market are in developing stage and they cannot be used efficiently.

The principle of bobbin degrade dyeing system is as follows. The bobbin, whereon yarn is wrapped, is positioned at an orthogonal positioned to the center of the mold which is formed by three covers. The covers of the mold are closed and at most three colored dye can be given to the bobbin through the holes provided at the covers. In the bobbin degrade dyeing process, dye quality and fastness differentiate between the surfaces by means of the yarn dye in the middle of the outer surface and of the inner surface of the bobbin. The reason for this is that even if the bobbin is tried to be dyed with pressure from the inner side and from the outer side, the yarn which accumulates from the surface to the deep part functions as a filter for the dyeing substance. Moreover, in this system, because of the cylindrical structure of the bobbin, the dyed part on the bobbin surface is long and the dyed part at the deep diameter of the bobbin is short. This is a problematic effect in knitting and weaving and cannot be used in every area. Besides, because of opening and closing of the mold cover in a single axis, the report operation opportunity has not been given.

Mosaic yarn study is realized by means of respectively feeding two cords, which are in different colors, according to the report by means of increasing classical ring spinning machines to four cylinders. In the study, one main color and one side color can be used. The problems with two colored fancy yarn are as follows even though it seems to be ideal: More than two colors cannot be studied. In order to be able to obtain the two colors, the dyed fiber shall be passed to the ring spinning machine through preparation passages. This leads to time loss in a ring spinning plant and decreases plant efficiency. Moreover, the passage adjustments shall be changed and continuously controlled. Otherwise, fault may occur.

As a result, because of all of the abovementioned problems, an improvement is required in the related technical field.

BRIEF DESCRIPTION OF THE INVENTION

The present invention relates to a dyeing machine, for eliminating the above mentioned disadvantages and for bringing new advantages to the related technical field.

An object of the present invention is to provide a dyeing machine in order to provide dyeing of yarn in textile with the desired length and with the desired color.

In order to realize the abovementioned object and the objects which are to be deducted from the detailed description below, the present invention is a dyeing machine having at least one each vertical guides positioned at the two sides of at least one body for realizing dyeing during wrapping of the yarn from at least one first bobbin to the second bobbin, at least one sprayer drive mechanism which can move vertically on said vertical guide, at least one bobbin carrier, at least one drum which contacts the surface of said second bobbin positioned on said bobbin carrier, at least one first drive element where said drum is connected from one side for providing movement of said drum, at least one fourth drive element for moving said sprayer drive mechanism, at least one sprayer which realizes dyeing while the yarn, positioned on said sprayer drive mechanism, is wrapped onto the second bobbin, and at least one pump connected to at least one dye kier for obtaining the dye needed by said sprayer. Accordingly, in order to provide realization of stamping dyeing, the subject matter dyeing machine comprises at least one sensor which detects the deviation between the position of the sprayer and at least one predetermined stamping region on said second bobbin, at least one second drive element configured to rotate the second bobbin in a direction which is opposite to the direction of the first drive element in order to provide alignment of the sprayer with said stamping region, and at least one control unit associated to said sensor in order to control the operation of said fourth drive element by means of said second drive element. Thus, during wrapping of the yarn from one bobbin to another bobbin, it can be dyed with the desired length and with the desired color.

In a possible embodiment of the present invention, at least one memory unit is provided in order to pre-define the work flow to said control unit. Thus, the report, prepared beforehand for yarn, is recorded and said report is transferred to the control unit.

In a possible embodiment of the present invention, at least one shuttle is provided in order to adjust the winding angle during winding of the yarn from the first bobbin to the second bobbin. Thus, irregular winding of the yarn onto the second bobbin is prevented and the moire effect faults on the yarn are prevented.

In a possible embodiment of the present invention, at least one third drive element is connected in order to move the shuttle. Thus, the shuttle can be moved independently during dyeing.

In a possible embodiment of the present invention, at least one piston is provided which positions the sprayer in order to realize stamping dyeing. Thus, the sprayer is approached to the second bobbin and stamping dyeing is realized in an efficient manner.

In a possible embodiment of the present invention, the second bobbin is moved by means of contacting the surface by means of at least one drum. Thus, the second bobbin is rotated around its own axis and the yarn is wrapped.

DETAILED DESCRIPTION OF THE INVENTION

In this detailed description, the subject matter dyeing machine (1) is explained with references to examples without forming any restrictive effect only in order to make the subject more understandable.

Figure 1:
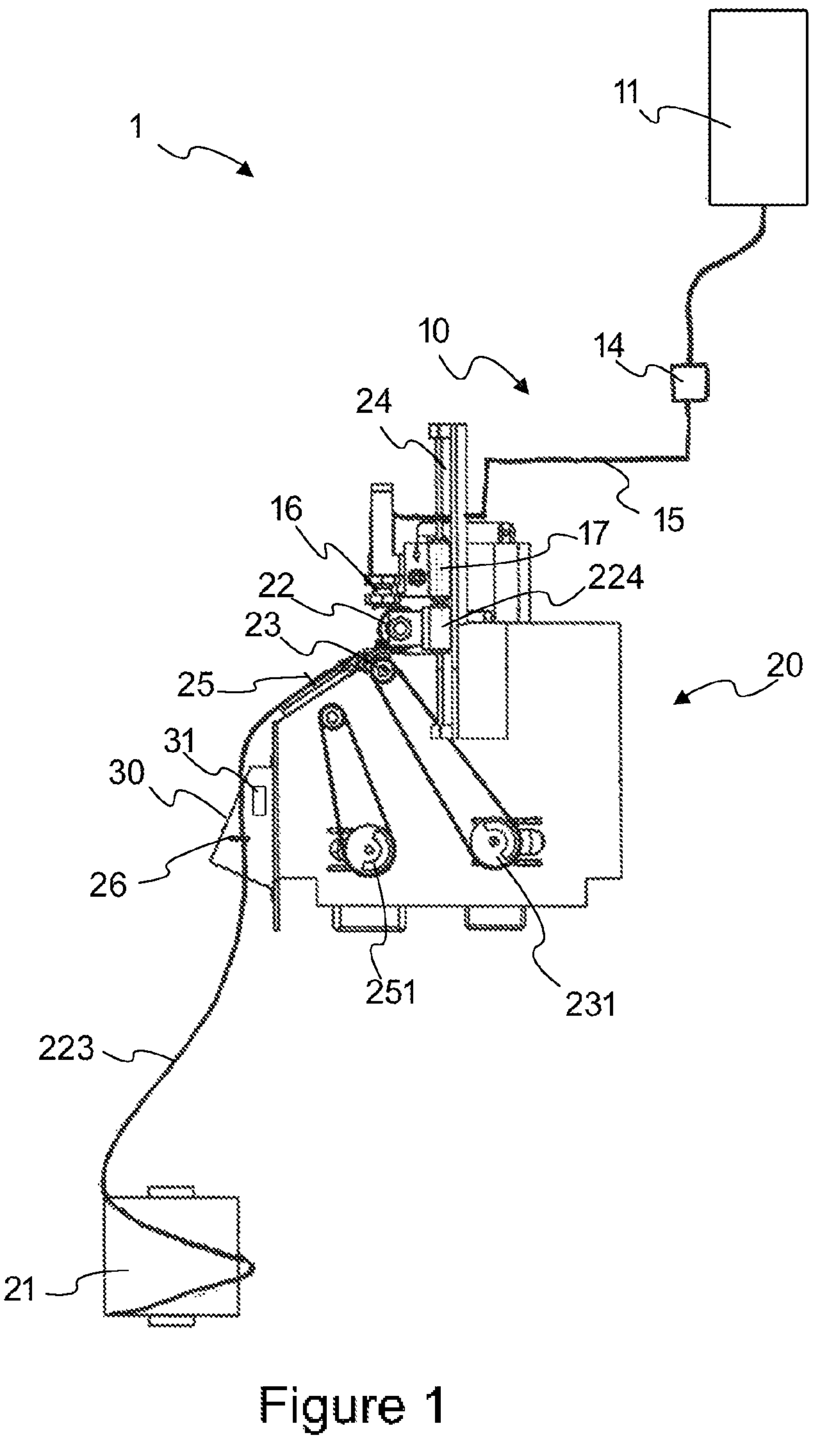
FIG. 1 is a representative frontal schematic view of the subject matter dyeing machine.
Figure 2:
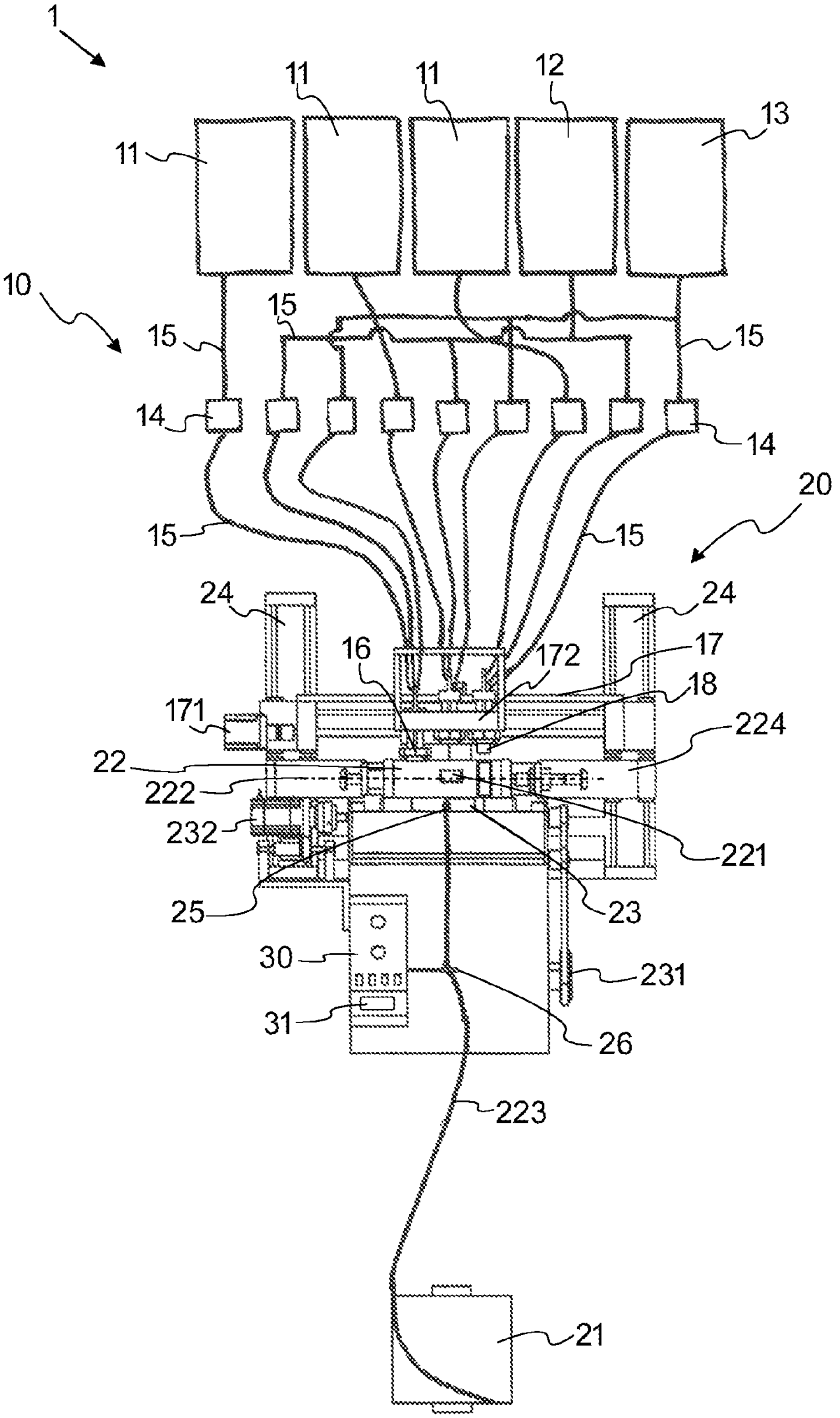
FIG. 2 is a representative schematic view of the subject matter dyeing machine from the left side.

In FIGS. 1 and 2, representative schematic views of the subject matter dyeing machine (1) are given. The present invention relates to a dyeing machine (1) which provides dyeing of yarn (223) with desired colors. Said dyeing machine (1) has at least one spraying mechanism (10) on at least one body (20).

In said body (20), dyeing is realized during wrapping of the yarn (223) from at least one first bobbin (21) to at least one second bobbin (22). The unwinding of the yarn (223) from said first bobbin (21) and the winding of the yarn (223) onto said second bobbin (22) are provided by means of driving of at least one drum (23) by means of at least one first drive element (231). The surfaces of the second bobbin (22) and the drum (23) are in contact with each other and as the drum (23) rotates around its own axis, the second bobbin (22) also rotates around its own axis. The drum (23) is positioned in a parallel manner to the bobbin center axis (222) and it is connected to said first drive element (231) from one end thereof. The connection of the drum (23) and the first drive element (231) to each other can be provided by means of elements like belt, chain or geared wheel. The drum (23) is connected to the first drive element (231) from one end and it is connected to at least one second drive element (232) from the other end. Said second drive element (232) moves the drum (23) in a direction which is opposite to the operation of the first drive element (231). At least one balloon breaker (26) and at least one shuttle (25) guide the wrapping of yarn (223) onto the second bobbin (22) moved by the drum (23). Said shuttle (25) is connected to at least one third drive element (251) and moves in a parallel manner to the bobbin center axis (222). The balloon breaker (26) is an element known in the art, which provides more rapid unwrapping of the yarn (223) from the first bobbin (21). At least one each orthogonal guide (24) is positioned at the two sides of the body (20). On said orthogonal guide (24), at least one bobbin carrier (224) and at least one sprayer drive mechanism (17) are positioned in a movable manner in the vertical axis. The second bobbin (22) is positioned on said bobbin carrier (224) and the vertical movement of the bobbin carrier (224) is provided as the yarn (223) widens the periphery of the second bobbin (22) during dyeing. On the bobbin carrier (224), there is a plug-and-remove structure which facilitates fixation and removal of the second bobbin (22).

The spraying mechanism sprays the dye onto the second bobbin (22) and dyes the second bobbin (22). Spraying of the dye onto the second bobbin (22) is realized by means of at least one sprayer (16). In a possible embodiment of the present invention, there are pluralities of sprayers (16) and said sprayers (16) provide dyeing of the yarn (223) with different colors. The sprayer (16) is positioned on said sprayer drive mechanism (17) and it is connected to at least one piston (172) and at least one sensor (18). Said sensor (18) detects the decrease of the distance between the second bobbin (22) and the sprayer (16) during winding and positions the sprayer drive mechanism (17). Positioning of the sprayer drive mechanism (17) is provided by means of moving by at least one fourth drive element (171). Thanks to this, the sprayer (16) sprays dye to the yarn (223) provided on the second bobbin (22) at the desired position. Besides, by means of said piston (172), the sprayer (16) can be approached to and diverged from the second bobbin (22). The sprayer (16) is connected by using at least one hose (15) by means of at least one pump (14). In a possible embodiment of the present invention, said pump (14) has a peristaltic structure and provides usage of desired amount of dye. The pump (14) is connected to at least one dye kier (11), at least one salt kier (12) and at least one soda kier (13) by using the hose (15). In order to increase the dyeing quality in said dye kier (11), temperature control and stirring equipment can be positioned.

On the body (20), at least one control unit (30) and at least one memory unit (31) connected to the control unit (30) are positioned. Said memory unit (31) is the electronic unit where the work flow, existing on the yarn (223), is recorded beforehand. The control unit (30) controls and guides all movable elements of the dyeing machine (1) depending on the orientation of the operator and depending on the dyeing process recorded in the memory unit (31).

In more details, the subject matter dyeing machine (1) provides dyeing of the yarn (223) during wrapping of the yarn (223) from the first bobbin (21) onto the second bobbin (22). Accordingly, the operator loads the dyeing report to the memory unit (31) in electronic medium. The control unit (30) moves the first drive element (231) in the direction of the information received from the memory unit (31) and rotates the drum (23) around its own axis. The drum (23), which rotates around its own axis, rotates the second bobbin (22) and begins wrapping the yarn (223). During wrapping of the yarn (223), the sprayer (16) sprays the dye onto the yarn (223) and provides dyeing of the yarn (223). During wrapping of the yarn (223) onto the second bobbin (22), the shuttle (25) controls the wrapping angle depending on the increasing diameter of the second bobbin (22) and provides continuous dyeing onto the yarn (223). The third drive element (251) provides movement of the shuttle (25) and is guided by the control unit (30). As the diameter of the second bobbin (22) increases together with the winding, the bobbin carrier (224) rises on the orthogonal guides (24). The sensor (18) detects the rising second bobbin (22) and positions the sprayer drive mechanism (17) dependingly. The sprayer (16) realizes dyeing by means of spraying the dye onto the second bobbin (22). Pressurized spraying is realized by means of the dye received from the dye kier (11) by the pump (14). After the dyeing process, the sprayer (16) sprays the salt, received from the salt kier (12), onto the second bobbin (22) and sprays the soda, received from the soda kier (13), onto the second bobbin (22).

Stamping dyeing is also realized onto the second bobbin (22) besides spray dyeing. The stamping dyeing is the process of spraying of the dye onto the second bobbin (22) by the sprayer (16) locally. By means of stamping dyeing, the desired short-distance color changes are obtained with high precision on the yarn (223). For this purpose, while dyeing is being realized, the rotation of the second bobbin (22) is stopped and a stamping region (221) is detected on the second bobbin (22) by the sensor (18), and the stamping region (221) is brought to the same alignment with the sprayer (16) by using the second drive element (232). When the stamping region (221) and the sprayer (16) are aligned with each other, said piston (172) approaches the sprayer (16) to the second bobbin (22). Afterwards, the stamping region (221) is dyed by means of spraying of the dye by the sprayer (16).

Thus, the yarn (223) is dyed with the desired length and with the desired colors. Moreover, by inversely turning the drum (23) and by stamping dyeing onto the second bobbin (22), the dyeing quality is increased and short-distanced dye passages can be obtained.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

REFERENCE NUMBERS

1 Dyeing machine
10 Spraying mechanism
11 Dye kier
12 Salt kier
13 Soda kier
14 Pump
15 Hose
16 Sprayer
17 Sprayer drive mechanism
171 Fourth drive element
172 Piston
18 Sensor
20 Body
21 First bobbin
22 Second bobbin
221 Stamping region
222 Bobbin center axis
223 Yarn
224 Bobbin carrier
23 Drum
231 First drive element
232 Second drive element
24 Vertical guide
25 Shuttle
251 Third drive element
26 Balloon breaker
30 Control unit
31 Memory unit

The invention claimed is:

1. A dyeing machine for realizing dyeing during wrapping of at least one yarn from at least one first bobbin to a second bobbin, having:
- at least one each vertical guides positioned at two sides of at least one body,
- at least one sprayer drive mechanism which can move vertically on a vertical guide;
- at least one bobbin carrier,
- at least one drum which contacts a surface of said second bobbin positioned on said at least one bobbin carrier,
- at least one first drive element where said at least one drum is connected from one side for providing movement of said at least one drum,
- at least one fourth drive element for moving said at least one sprayer drive mechanism,
- at least one sprayer which realizes dyeing while the yarn is wrapped onto the second bobbin, and
- at least one pump connected to at least one dye kier for obtaining the dye needed by said at least one sprayer;

wherein:
- the dyeing machine comprises at least one second drive element configured to rotate the second bobbin in a direction which is opposite to direction of the at least one first drive element in order to provide alignment of the at least one sprayer with at least one predetermined stamping region;
- at least one control unit which associated to at least one sensor which detects deviation between position of the at least one sprayer and said predetermined stamping region on said second bobbin; and
- the at least one control unit controls the operation of said at least one fourth drive element and said at least one second drive element.

2. The dyeing machine according to claim 1, wherein at least one memory unit is provided in order to pre-define a work flow to said control unit by containing instructions for allowing the control unit to operate functions of the dyeing machine and to provide alignment of the at least one sprayer.

3. The dyeing machine according to claim 1, wherein at least one shuttle is provided in order to adjust a winding angle during winding of the yarn from the at least one first bobbin to the second bobbin.

4. The dyeing machine according to claim 3, wherein at least one third drive element is connected in order to move the at least one shuttle.

5. The dyeing machine according to claim 1, wherein at least one piston connected to the at least one sprayer drive mechanism is provided which positions the at least one sprayer in order to realize stamping dyeing.

* * * * *